United States Patent
Zeviar et al.

(10) Patent No.: US 10,482,340 B2
(45) Date of Patent: Nov. 19, 2019

(54) SYSTEM AND METHOD FOR OBJECT RECOGNITION AND RANGING BY DEFORMATION OF PROJECTED SHAPES IN A MULTIMODAL VISION AND SENSING SYSTEM FOR AUTONOMOUS DEVICES

(71) Applicant: Samsung Electronics Co., Ltd., Suwon-si (KR)

(72) Inventors: Dante Zeviar, Santa Rosa, CA (US); Frantz Lohier, El Cerrito, CA (US)

(73) Assignee: Samsung Electronics Co., Ltd. (KR)

( * ) Notice: Subject to any disclaimer, the term of this patent is extended or adjusted under 35 U.S.C. 154(b) by 48 days.

(21) Appl. No.: 15/497,847

(22) Filed: Apr. 26, 2017

(65) Prior Publication Data

US 2018/0157925 A1    Jun. 7, 2018

Related U.S. Application Data

(60) Provisional application No. 62/430,436, filed on Dec. 6, 2016.

(51) Int. Cl.

| | |
|---|---|
| *G06K 9/20* | (2006.01) |
| *G06K 9/00* | (2006.01) |
| *G06K 9/32* | (2006.01) |
| *G06K 9/46* | (2006.01) |
| *G06K 9/62* | (2006.01) |
| *G06T 7/246* | (2017.01) |

(52) U.S. Cl.
CPC ....... *G06K 9/2036* (2013.01); *G06K 9/00805* (2013.01); *G06K 9/209* (2013.01); *G06K 9/3233* (2013.01); *G06K 9/46* (2013.01); *G06K 9/6201* (2013.01); *G06T 7/246* (2017.01); *G06K 9/0063* (2013.01); *G06K 9/2018* (2013.01); *G06T 2207/10016* (2013.01); *G06T 2207/20016* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 6,408,293 B1 * | 6/2002 | Aggarwal | G06F 16/5838 |
| 9,432,421 B1 * | 8/2016 | Mott | H04W 4/025 |
| 2014/0152823 A1 * | 6/2014 | Breed | B60R 25/25 |
| | | | 348/148 |
| 2017/0178352 A1 * | 6/2017 | Harmsen | G06T 7/579 |

* cited by examiner

*Primary Examiner* — Vikkram Bali
(74) *Attorney, Agent, or Firm* — McAndrews, Held & Malloy, Ltd.

(57) ABSTRACT

Provided is a disclosure for detection and recognition of objects using a projected array of light shapes of one or more frequencies, where the light may be structured or non-structured.

20 Claims, 10 Drawing Sheets

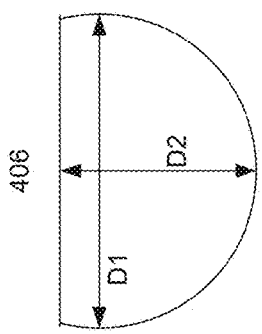
FIG. 4A
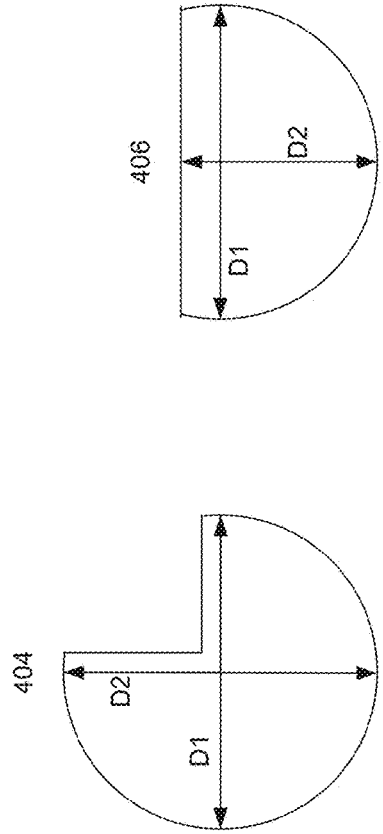
FIG. 4B
FIG. 4C
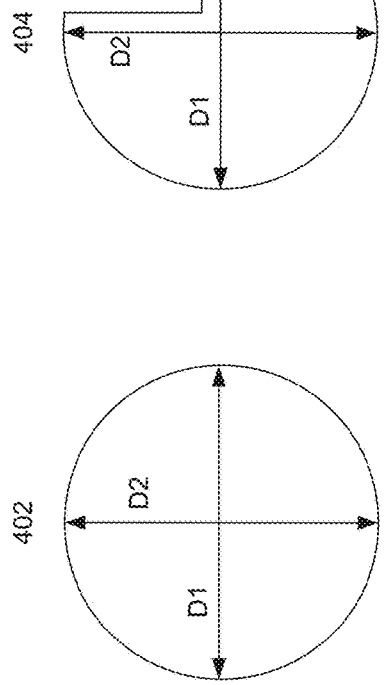
FIG. 4D
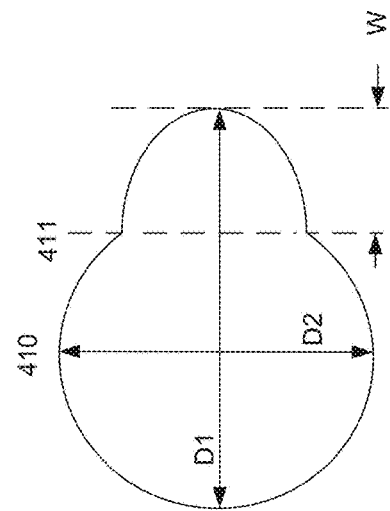
FIG. 4E
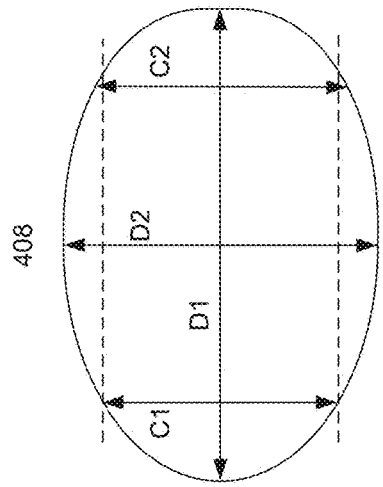

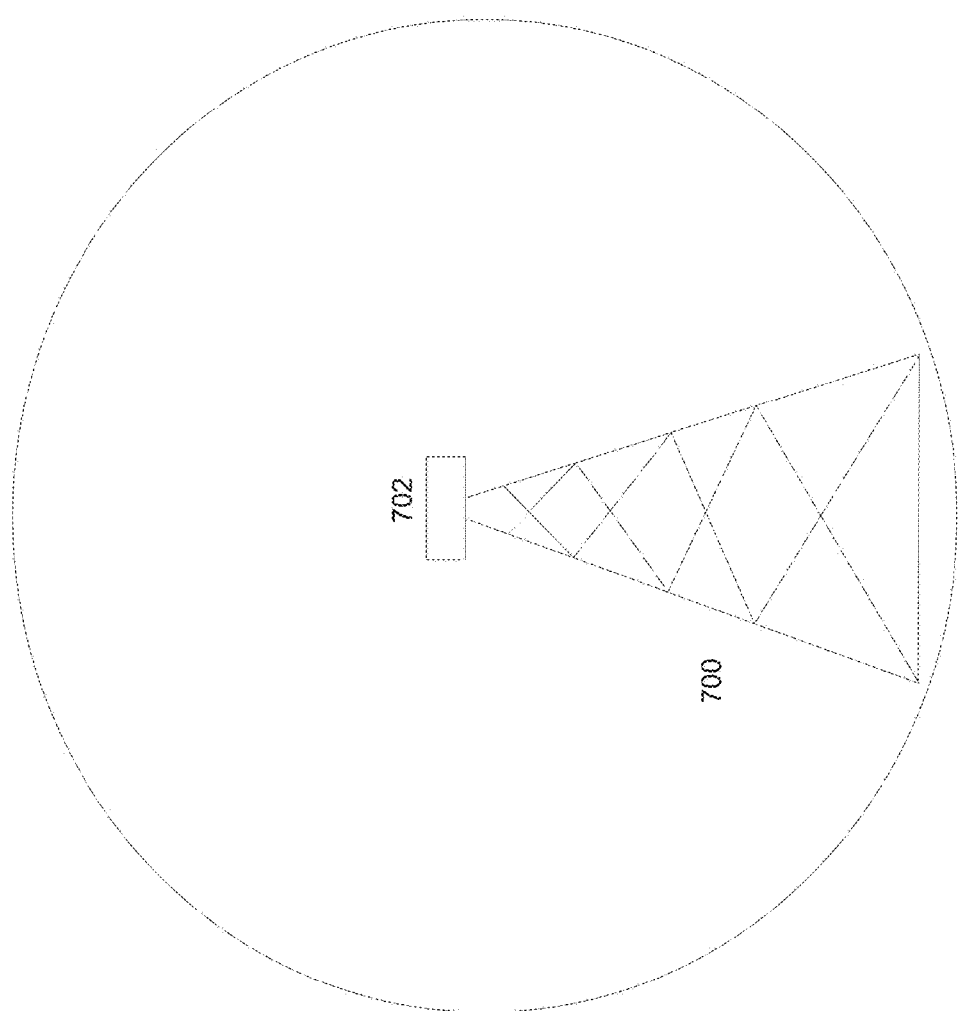

SYSTEM AND METHOD FOR OBJECT RECOGNITION AND RANGING BY DEFORMATION OF PROJECTED SHAPES IN A MULTIMODAL VISION AND SENSING SYSTEM FOR AUTONOMOUS DEVICES

RELATED APPLICATION(S)

This application claims the benefit of priority to the U.S. Provisional Application 62/430,436, filed on Dec. 6, 2016, the disclosure of which is incorporated herein in its entirety by reference.

BACKGROUND

The present disclosure relates to a vision system, and more particularly, to object recognition and ranging by deformation of projected shapes, among other modalities in a multimodal vision system for autonomous devices. Various efforts are being made for vision and sensing systems for object recognition and ranging, however, these efforts are time-consuming and may require expensive devices.

Various limitations and disadvantages of conventional and traditional approaches will become apparent to one of skill in the art, through comparison of such systems with some aspects of the present disclosure as set forth in the remainder of this application with reference to the drawings.

SUMMARY

A system and/or method for object recognition and ranging by deformation of projected shapes, substantially as shown in and/or described in connection with at least one of the drawings.

Various advantages, aspects, and novel features of the present disclosure, as well as details of an illustrated embodiment thereof, will be more fully understood from the following description and drawings.

BRIEF DESCRIPTION OF THE DRAWINGS

The above and other objects, features and advantages of the present disclosure will become more apparent from the following detailed description when taken in conjunction with the accompanying drawings in which:

FIG. 4A is an example of detecting a perpendicular flat surface, in accordance with an embodiment of the disclosure.

FIG. 4B is an example of detecting a corner of a flat surface, in accordance with an embodiment of the disclosure.

FIG. 4C is an example of detecting an edge of a flat surface, in accordance with an embodiment of the disclosure.

FIG. 4D is an example of detecting a flat surface slanting with respect to the detecting device, in accordance with an embodiment of the disclosure.

FIG. 4E is an example of detecting a perpendicular flat surface with a portion of the flat surface slanting with respect to the detecting device, in accordance with an embodiment of the disclosure.

FIG. 7 is an example of arrays projected all around a stationary object, in accordance with an embodiment of the disclosure.

DETAILED DESCRIPTION

Figure 1A:
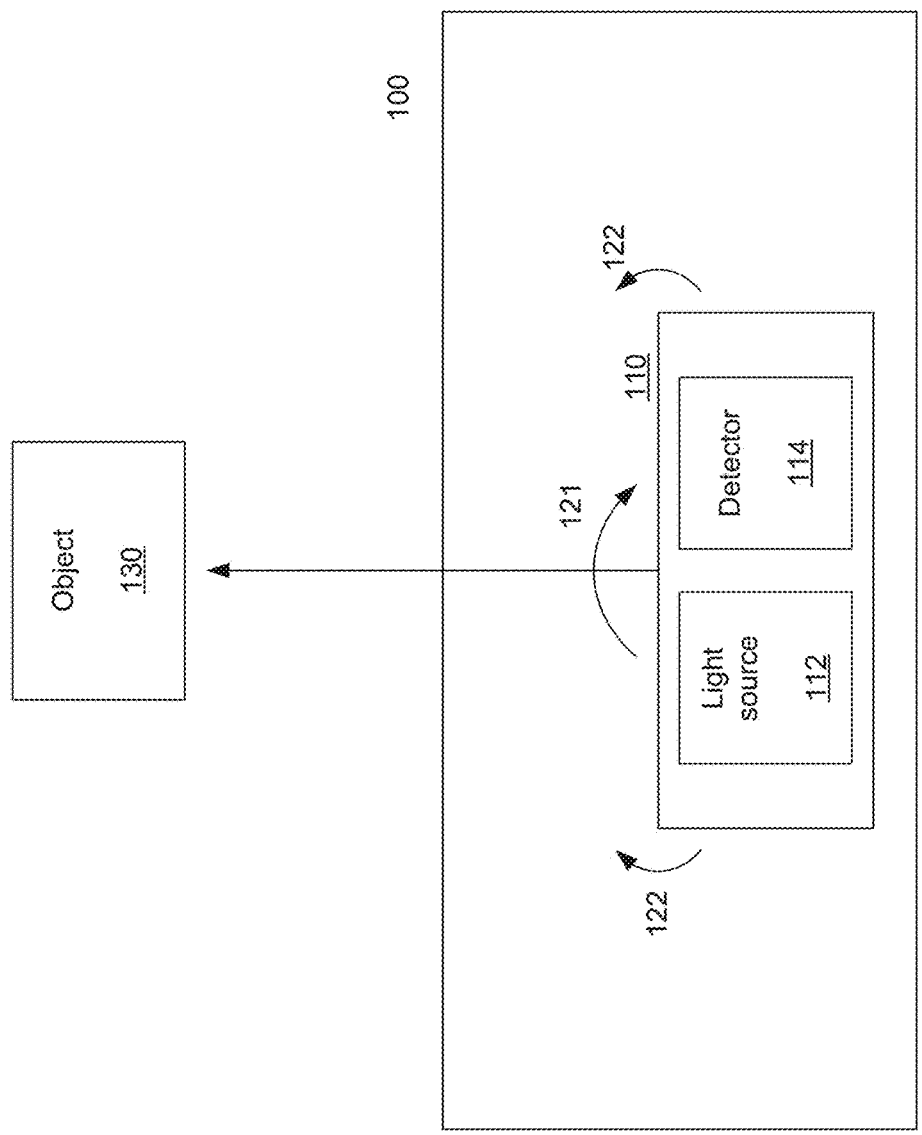
FIG. 1A is an illustration of a device for projecting an array of light shapes for detecting objects, in accordance with an embodiment of the disclosure.

The present embodiments should not be construed as being limited to the descriptions set forth herein. Rather, these embodiments are provided as examples (such as, without limitation, variations of the surfaces onto which a shape is projected, the angle of incidence of the projection onto such a surface, the nature and configuration(s) of the elements projected, and the like) so that this disclosure will be thorough and complete and will fully convey the concept of the present embodiments to one of ordinary skill in the art. The appended claims illustrate some of the embodiments of the present disclosure.

In the following discussion, the phrases "for example," "e.g.," and "exemplary" are non-limiting and are generally synonymous with "by way of example and not a limitation," "for example and not a limitation," and the like.

As utilized herein, "and/or" means any one or more of the items in the list joined by "and/or." As an example, "x and/or y" means "one or both of x and y." As another example, "x, y, and/or z" means any element of the seven-element set $\{(x), (y), (z), (x, y), (x, z), (y, z), (x, y, z)\}$.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "above," "lower," "below," "side," "lateral," "horizontal," "vertical," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

It will also be understood that terms coupled, connected, attached, and the like include both direct and indirect (e.g., with an intervening element) coupling, connecting, attaching, and the like, unless explicitly indicated otherwise. For example, if element A is said to be coupled to element B, element A may be indirectly coupled to element B through an intermediate structure, element A may be directly coupled to element B, and the like.

In the drawings, the dimensions of devices, structures, layers, regions, and the like, (e.g., absolute and/or relative dimensions) may be exaggerated for clarity. While such dimensions are generally indicative of an example implementation, they are not limiting. For example, if structure A is illustrated as being larger than structure B, this is generally indicative of an example implementation, but structure A is generally not required to be larger than structure B, unless otherwise indicated. Additionally, in the drawings, like reference numerals may refer to like elements throughout the discussion.

Like reference numerals refer to like elements throughout the specification. All terms including descriptive or technical terms used herein should be construed as having meanings that are obvious to one of ordinary skill in the art. When a term has an ambiguous meaning due to evolving of language, precedent cases, or the appearance of new technologies, the meaning of a term used in this disclosure should first be clarified by its usage and/or definition in this disclosure. The term should then be clarified as one of ordinary skill in the art would have understood the term at the time of this disclosure.

When a part "includes" or "comprises" an element, unless there is a particular description contrary thereto, the part can further include other elements. The term "unit" in the embodiments of the present disclosure means a software component or a hardware component that performs a specific function. A function provided by a "unit" may be divided into additional components and "units." The hardware component may include, for example, a field-programmable gate array (FPGA) or an application-specific integrated circuit (ASIC).

Software, or software component, may refer to executable code and/or data used by the executable code in an addressable storage medium. Thus, software may be, for example, object-oriented software components, class components, and task components, and may include processes, functions, attributes, procedures, subroutines, segments of program code, drivers, firmware, application programs, micro codes/circuits, data, a database, data structures, tables, arrays, or variables.

Reference will now be made in detail to embodiments, examples of which are illustrated in the accompanying drawings. In this regard, the present embodiments may have different forms and should not be construed as being limited to the descriptions set forth herein.

In the following description, well-known functions or constructions are not described in detail so as not to obscure the embodiments with unnecessary detail.

FIG. 1A is an illustration of a device for projecting an array of light shapes for detecting objects, in accordance with an embodiment of the disclosure. Referring to FIG. 1A, there is shown a platform 100 with shape detection device 110 comprising a light source 112 and a detector 114. There is also shown an object 130 that may be detected using the shape detection device 110. The light source 112 may be any type of suitable device that can project, for example, an array of light shapes. While the array of light shapes can comprise any suitable shape (circle, square, and the like), for ease of explanation, the shape may be assumed to be a circle of light (light circle) generated by, for example, a laser device. Accordingly, an array of light shapes may be determined, without limitation, according to various permutations that may be, for example, design and/or implementation dependent.

The array may be a geometric shape suitable for projection. For example, an array may comprise N×N circles of light. An embodiment may have N equal to 4, and, therefore, there may be 4 rows of 4 circles in the array. It should be noted that setting N=4 is strictly an example, and various embodiments of the disclosure need not be so limited. Additionally, while a square array of N×N may be used, various embodiments need not be so limited. Accordingly, an array may be a rectangular shape of M×N, trapezoidal, or some other suitable shape. Additionally, the array may project different shapes and/or sizes at different positions for specific purposes. For example, the different size and/or shape may indicate a position in the array. There may also be different colors (wavelengths) used for different positions of the array, or for specific environmental conditions, and the like. Some embodiments of the disclosure may use, for example, a single light shape that is scanned to effectively form an array over time.

The detector 114 may be any suitable device that may be used to detect the array of light shape. For example, the detector 114 may be a camera such as a CMOS camera, or a camera using any other technology suitable for detecting a projected array of light shapes.

The light source 112 may project a large array of light circles to cover a large area, or may project a smaller array. The light shapes will be described as circles for ease of explanation. The light source 112 may also sweep (scan) horizontally and/or vertically with an array of light circles. It may be noted that while horizontal and vertical sweeps are mentioned, other sweeps used may be diagonal, or some other suitable sweep pattern.

When the projected light circles hit a vertical plane of the object 130, the detector 114 may detect circular shapes. The light circles may be larger if the object 130 is farther away than if it is closer. Additionally, if a light circle hits an edge of the object 130, the detected shape for that circle may be a part of a circle. Or if the light circle hits a plane surface that is angled toward or away from the light source 112, the detected shape may be non-circular since the area that "falls off" the edge may be deformed such that it does not form a circle with the rest of the light circle. These shapes will be described in more detail with respect to FIGS. 4A-4E.

Accordingly, by processing the detected light circles with respect to their reflections off flat surfaces, angled surfaces, and edges, it may be possible to determine a distance of the object 130, as well as identify the object 130. The identification may use, for example, a fiducial point pattern library, or the like, that was downloaded and/or cloud-based and accessed for this purpose. The identification may further comprise a software module that is able to use rules to determine a shape and/or "learns" over time.

In an embodiment, a detected array of light shapes reflecting off an object may be compared to the various object shapes in a library. A match may be made when the detected array of light shapes matches an object shape to at least to a threshold degree of certainty. The threshold degree of certainty may vary dynamically depending on the condition of the environment around, for example, a vehicle such as the vehicle 150. For example, when it is dark, crowded with traffic, bad weather, and the like, the threshold degree of certainty may be lowered. When it is bright, the road is dry, and there is not much traffic, the threshold degree of certainty may be raised.

All object shapes that match an array of detected light shapes to a pre-determined first threshold matching score may be referred to as primary object shapes. The object shape with the highest matching score may be correlated to an array of detected light shapes. An array of detected light shapes that does not match a primary object shape may be checked for secondary object shapes, where the secondary object shapes match the array of detected light shapes to a pre-determined second threshold matching score, which is lower than the pre-determined first threshold matching score. The object shape with the highest matching score may then be correlated to the array of detected light shapes.

While the object shapes in a library have been grouped to primary and secondary object shapes, an embodiment of the disclosure need not be so limited. There may be multiple different groups for the object shapes depending on their degree of certainty of matching a detected array of light shapes.

In some embodiments, the validity of the secondary object shape correlated to the detected array of light shapes may be verified. Verification may, for example, vary depending on the secondary shape. For example, if the secondary shape is a simple shape, the validity of the secondary shape may not be verified. However, if the shape is complex, various reflections may need to be used to validate the secondary shape. This may be because the reflection being verified may match many different shapes. Also, various embodiments may verify the primary object shape. If there are other object shape categories below the secondary object shapes, then those object shapes may also be verified if one of them is correlated to the detected array of light shapes.

The shapes may also be matched in one or more libraries, where one or more of those libraries may be co-located on the platform 100 or the shape detection device 110. The library (or libraries) not co-located may be, for example, in one or more cloud servers. Other embodiments may have all libraries in one or more cloud servers.

The degree of certainty may refer to how accurately a detected array of light shapes matches an object shape. For example, an algorithm for determining a match may take into account the number of light shapes reflecting from the object, spatial relationship between the detected adjacent light shapes, distortion of a detected light shape, the number of fiducial points gleaned from the array of detected light shapes, and the like.

Accordingly, it can be seen that there are numerous ways of summarizing an array of light shapes for comparison to a library of object shapes. A specific way of summarizing an array of light shapes may be design and/or implementation dependent. For example, some variables may be the amount of information from a sensor (camera), the capability of processing hardware, the amount of time needed or available for performing a match, and the like.

A process for matching a detected array of light shapes to an object shape may vary. For example, the detected array of light shapes may be deemed to match the first object shape in a library that is at or above a threshold degree of certainty (for example, 80%), where the threshold may be variable as explained. The search may keep track of and update an object that has the highest degree of certainty. The search may stop at the first object shape that is at or above the threshold degree of certainty. After a certain number of attempted matches, or search time, the object shape that has the highest degree of certainty may be deemed to be a match. Or the search may continue until the entire library has been searched. Accordingly, it can be seen that there are various methods of searching.

The library may comprise various shapes that can be detected, as well as various scenes/scenarios that may be detected. Various objects may be quickly recognized by matching with shapes in the library. Correspondingly, a set of fiducial points could indicate a dog, a bicycle, a pedestrian, and the like. Also an area may be detected and identified by recognizing several things in proximity to each other. For example, an intersection may be determined by detecting the corners of the streets, crosswalks/sidewalks, traffic lights, pedestrian(s)/vehicle(s) crossing the streets, and the like.

The library may also be supplemented by, for example, a location/map application that may locate specific items/places such as an intersection. Additionally, the library may be added to or amended, at least temporarily, by detection of, for example, real-time events such as construction at the intersection, accidents, and the like. The library may also grow by adding additional shapes that are detected, as well as permutations of existing shapes. Accordingly, various embodiments of the disclosure may use quick detection and identification, either by using the library of shapes or algorithms that look for specific patterns as an "early warning" system. Upon detection of what may be a critical item by a system in, for example, a vehicle, appropriate action can be started if time is of essence while further detection takes place for appropriate follow-up action depending on what the detected object is determined to be.

While the light source 112 is described as projecting an array of light circles, each light circle may also be described as a light point that spreads to a circle as the light circle propagates to the object 130.

Various embodiments may offer different horizontal and/or vertical resolution for specific purposes. For example, in a normal detecting mode, the light source 112 may project an array of light circles that covers a large area. This may allow a coarse detection of an object with minimal processing, with lower resolution. When the object 130 is detected, the light source 112 may shift to tracking mode where the same number of light circles may be projected in a smaller area where the object 130 was detected in the detecting mode. This may allow for higher resolution to better discern the identity of the object 130.

In the detecting mode, for example, the array may grow with the same number of larger light circles where each light circle is made larger, or the array may not change much in size but the number of light circles may be decreased. Other variations may be changing the intensity of the light circle, and/or the projected light may be changed from one shape to other shapes. Accordingly, various embodiments of the disclosure may use different permutations of width and height of the array, the number of light circles in the array, the light shapes if different from circles, intensity of light, size of the light circles/shapes, and the like, for different occasions such as whether detecting or tracking, the amount of external shapes to detect and/or track (city driving, country driving, rush hour, and the like), number of pedestrians/vehicles, weather, road conditions, amount of ambient light available, and the like. The size of the array (in width and height) may be determined with respect to, for example, a specific distance.

As an example, when in detecting mode, the light source 112 may not scan much, if at all. When in tracking mode, the light source 112 may scan in a limited area of interest to effectively increase the light circle density to get more detailed information about the object 130 being tracked. The scanning may be horizontal (shown by the arrow 121) and/or vertical (shown by the arrow 122), for example, to get the desired resolution in the area of interest. Furthermore, the detector 114 may also have optical zoom capability in addition to software zoom capability, as well as an ability to focus the direction from which to detect the light circles. This may allow the detector 114 to work in conjunction with the light source 112 to concentrate on an area to optimize tracking/identifying of the object 130. The scanning may be via movement of the light source 112 at a macro level (for example, the light source 112 moves) or micro level (for example, mirrors on a chip move) or by manipulation of light without using moving parts (for example, laser beam steering).

Accordingly, various embodiments of the disclosure may use different modes of light projection, as well as different array sizes, different numbers of light circles per line of array, and different number of lines in the array. Additionally, the light source 112 and the detector 114 may use different parts of the light spectrum, such as visible light, infrared light, and the like, and light intensity at different times of the day or environmental conditions. This may entail a light source 112 and a detector 114 that can work with multiple spectrums/wavelengths, or different lights sources 112 and/or detectors 114 to cover the various wavelengths desired.

Various embodiments may also have one or more of the light source 112 that may project light shapes at varying angular coverage, including 360 degrees, to detect objects all around the light source. Furthermore, various embodiments, including for those vehicles in the air (drones, airplanes, and the like), the light source 112 may project light shapes in, for example, a spherical volume or a portion of the spherical volume to detect objects all around the light source. Accordingly, the light source 112 may comprise multiple light sources 112, while in other embodiments the light source 112 may be a single light source 112. Similarly, the detector 114 may be a single detector 114 or multiple detectors 114.

Accordingly, various embodiments of the disclosure may have no moving parts, while other embodiments of the disclosure may have moving parts.

Figure 1C:
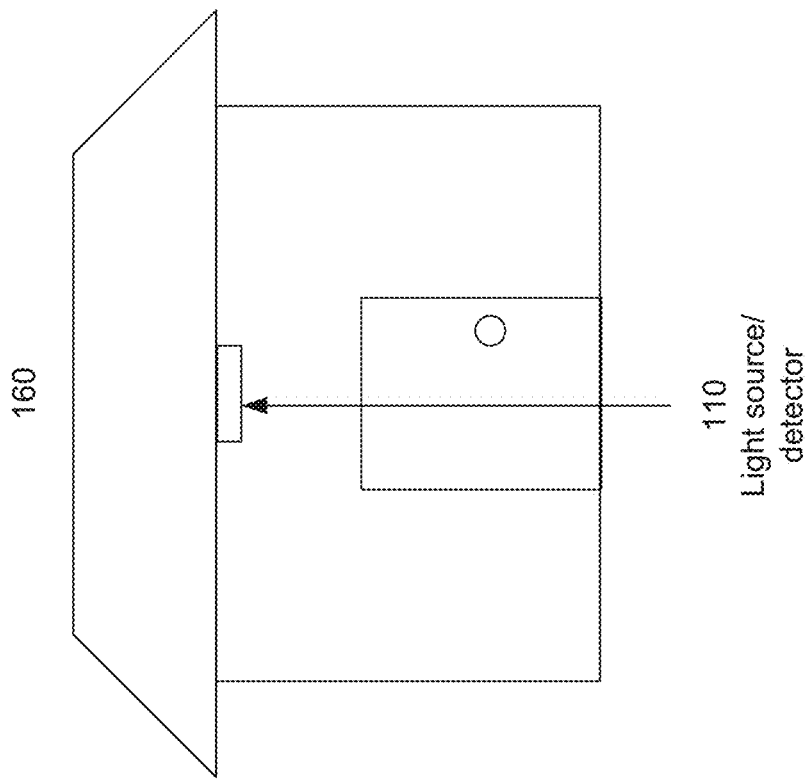
FIG. 1C is an illustration of a device on a stationary platform for projecting an array of light shapes for detecting objects, in accordance with an embodiment of the disclosure.
Figure 1B:
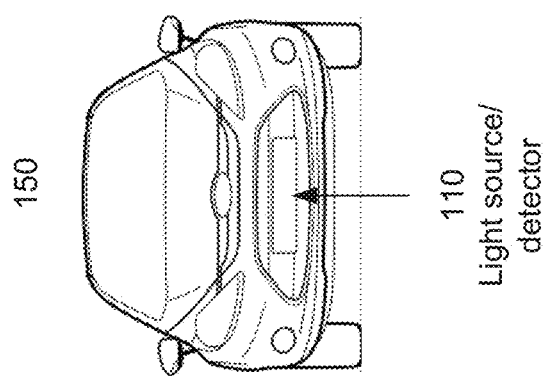
FIG. 1B is an illustration of a device on a mobile platform for projecting an array of light shapes for detecting objects, in accordance with an embodiment of the disclosure.

FIG. 1B is an illustration of a device on a mobile platform for projecting an array of light shapes for detecting objects, in accordance with an embodiment of the disclosure. Referring to FIG. 1B, there is shown a vehicle 150 that may be the platform 100 of FIG. 1A. Accordingly, the vehicle 150 may house the shape detection device 110 that has the light source 112 and the detector 114. The shape detection device 110 may be used by the vehicle 150 as one of many detection devices for autonomous driving and/or assisted driving.

Various embodiments may also provide for redundancy by having multiple shape detection devices 110 in different areas of the vehicle 150. For example, a shape detection device 110 may be at each side of the vehicle 150. Various embodiments may have a shape detection device 110 in a headlight, and the total light output of the light source 112 and the headlight may be such that the total light emitted by the headlight does not exceed any local regulation that may govern a headlight. For example, US regulations will be followed for those devices that are meant for use in the US, EU regulations will be followed for those devices that are meant for use in the EU, Chinese regulations will be followed for those devices that are meant for use in China, and the like. Whether the shape detection device 110 is in a headlight or some other part of a vehicle, the total power of light emitted for a particular band (visible, IR, and the like) can be controlled to meet the various regulations governing those bands.

The detector 114 may be more sensitive to the wavelength(s) output by the light source 112 than to the wavelength(s) of the light output by the headlight to illuminate the road ahead. There may be a single shape detection device 110 in the vehicle 150, or multiple shape detection devices 110 in the vehicle 150.

While some embodiments were described with respect to the vehicle 150, various embodiments of the disclosure may use the shape detection device 110 in a headlight embodiment in any vehicle (meant to operate in any environment—land, air, water, space, and the like), and also with other types of light such as a flashlight. For example, the shape detection device 110 may scan for objects in different directions than where the flashlight or the headlight of the vehicle 150 is pointed. As can be seen by those of ordinary skill in the art, an embodiment of the disclosure can be used in any number of different scenarios.

FIG. 1C is an illustration of a device on a stationary platform for projecting an array of light shapes for detecting objects, in accordance with an embodiment of the disclosure. Referring to FIG. 1C, there is shown a house 160 that may have the shape detection device 110. Some use scenarios may be to discriminate specific shapes to turn on outside lights, to control sprinklers, to alert residents of the house, and the like. For example, a shape that is similar to a pet (a cat or a dog) may not trigger any action. However, a wild animal (for example, raccoon, skunk, opossum, coyote, deer, and the like) may be recognized and a signal sent to, for example, a smart home controller (not shown) to turn on the lights and/or turn on the sprinkler system to scare away the animal.

Additionally, when a human shape is detected, the shape detection device 110 may send a signal to the smart home controller to turn on the light and/or turn off the sprinkler if the sprinkler will wet the area where the human shape is detected. The residents of the house 160 may also be alerted if the human shape is headed to the front door or nears the house 160. If the residents are not home, an alert may be sent, for example, via email and/or text. Various embodiments of the disclosure may have the shape detection device 110 perform these tasks autonomously or interactively with, for example, an accessible cloud based fiducial point(s) pattern library. The accessible cloud based fiducial point(s) pattern library may be, without limitation, in a cloud server or accessed via the cloud. For example, the shape detection device 110 may communicate with a cloud server and/or other nearby shape detection devices 110 corresponding to other implementations of the present disclosure for updates and/or to update other shape detection devices 110.

While only a single shape detection device 110 is shown, various embodiments of the disclosure need not be so limited. For example, there may be multiple shape detection devices 110 to cover the perimeter of the house 160. The shape detection device 110 for the house 160 may also be able to scan so that it can efficiently cover a large area to reduce the number of the shape detection devices 110. The shape detection device 110 may also be in the house 160 to provide intruder alert.

Accordingly, it can be seen that various embodiments of the disclosure may allow scanning devices for versatility, or have no scanning to keep cost down and/or improve reliability by removing moving parts.

Various embodiments of the disclosure may also have, for example, a single shape detection device 110 located on the vehicle 110 or the house 160 (and many other objects not specifically mentioned) such that a 360 degree projection in 3-dimension and detection is provided. This is described in more detail with respect to FIGS. 5 and 6.

Figure 2:
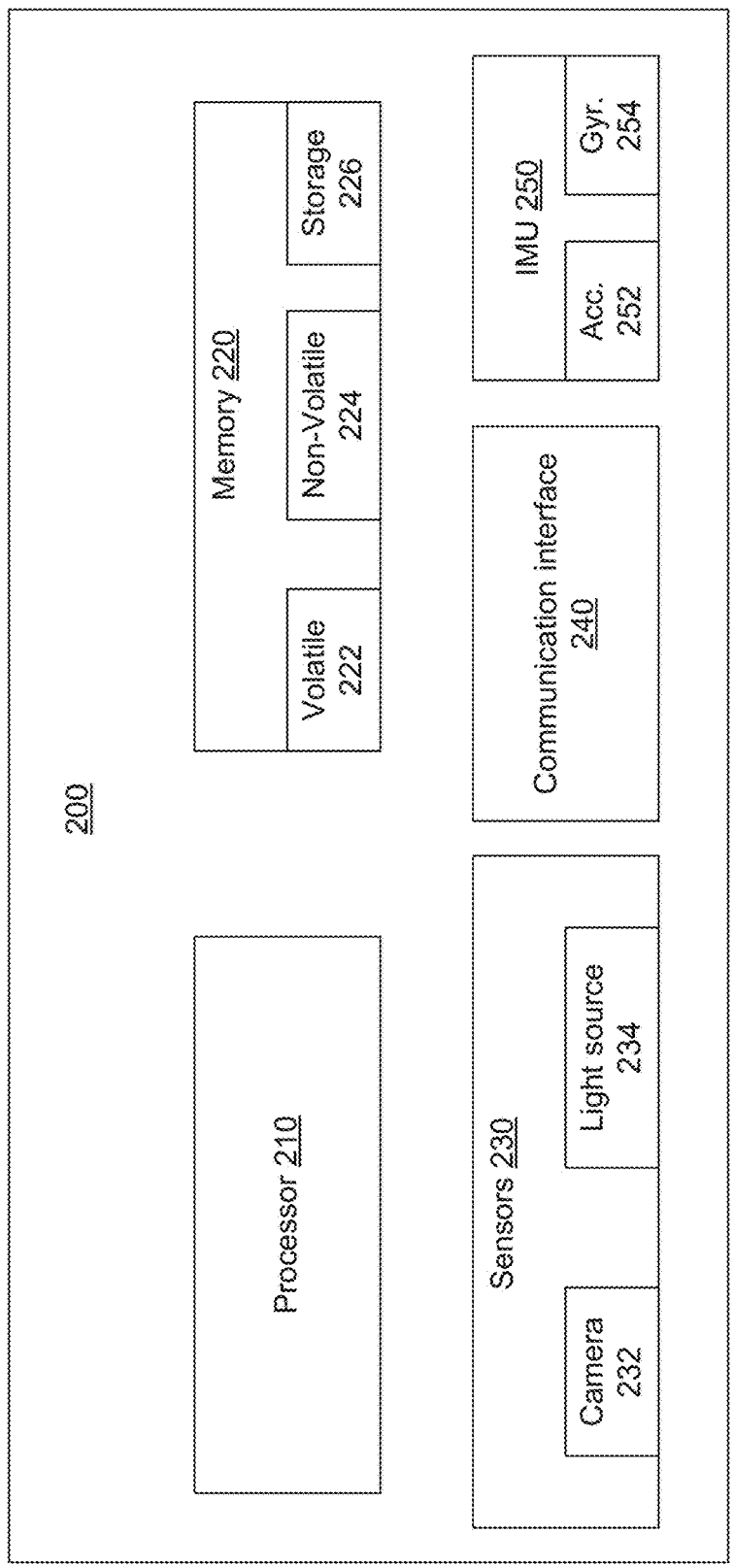
FIG. 2 is a high-level block diagram of a device for projecting an array of light shapes for detecting objects, in accordance with an embodiment of the disclosure.

FIG. 2 is a high-level block diagram of a device for projecting an array of light shapes for detecting objects, in accordance with an embodiment of the disclosure. Referring to FIG. 2, there is shown a platform 200 that may be similar to the platform 100. The platform 200 comprises a processor 210, a memory 220, projector/detector 230, a communication interface 240, and an inertial measurement unit (IMU) 250. The processor 210 may be any type of processor that is able to execute instructions such as, for example, a general purpose processor, a digital signal processor (DSP), a controller, a specialized processor for imaging, and the like. The memory 220 may comprise volatile memory 222, non-volatile memory 224, and/or mass storage 226. The mass storage 226 may comprise, for example, magnetic hard drives, optical media, FLASH memory, and the like. Data and executable instructions may be stored in the memory 220. The projector/detector 230 may be similar to the shape detection device 110. The communication interface 240 may comprise one or more circuitry to allow wired or wireless communication between the platform 200 and other devices. For example, wired communication may support USB protocol, Firewire protocol, and the like, and wireless communication may support cellular protocol(s), WiFi protocol, Bluetooth protocol, and the like. The communication interface 240 may also support memory devices that are plugged into a socket, such as, for example, a Flash memory device that is plugged into a USB socket. The IMU 250 may comprise, for example, various sensors that can detect motion and/or acceleration such as the accelerometer 252 and/or gyroscope/gyrometer 254.

The processor 210 may be independent of the projector/detector 230 and/or the communication interface 240, or a processor that is integrated with other parts. For example, the processor 210 may be integrated with the projector/detector 230, or is a processor that is logically a part of the projector/detector 230 and, accordingly, may control the projector/detector 230 and handle data to/from the projector/detector 230. The processor 210 may be an independent processor that works in conjunction with one or more processors, including a processor(s) that may be part of the projector/detector 230. The processor 210 may also be similarly configured for the communication interface 240 and the IMU 250. Various embodiments of the disclosure may support one or more processors for operation of the platform 200.

Accordingly, the processor 210 may control the camera 232 and the light source 234 to detect shapes within the reach of the light source 234. The processor 210 may also control the camera 232 and the light source 234 for detection at different distances, resolution, different image areas covered, and/or close-ups. The processor 210 may also determine appropriate actions to take based on the shape detected.

If the platform 200 is on the vehicle 150, the processor 210 may take different action depending on determination of the detected shape, or nature of the detected shape, and the like. For example, if the shape is that of a human or an animal, the processor 210 may take appropriate steps to control the vehicle 150 to avoid harming the human or the animal, as well as keeping the vehicle 150 and its occupants safe.

The processor 210 may track the object detected to determine whether course correction is needed. For example, if the processor 210 determines that the detected object is a light object such as a plastic bag that is fluttering in the air, there may not be any course correction needed. If the processor 210 determines that the detected object is heavy enough to cause damage to the vehicle 150 and/or the occupants, separate object(s), vehicle(s), person(s), pet(s), and the like, appropriate course correction may need to be performed, including slowing down, swerving, and/or braking to a stop. The course correction may be started and/or engaged by the processor 210, or by another processor external to the platform 200 whether in the vehicle 150 or not.

The processor 210 may also make predictions as to where the detected object(s) may be at different times in the future (for example, a fraction of a second later, 1 second later, 2 seconds later, 5 seconds later, and the like). For example, the detected object may be a person who does not hear or see the vehicle 150 or warnings sent by the vehicle 150 (such as, for example, honking of the horn, flashing of lights, and the like), or another vehicle, animal, and the like. Accordingly, based on current predictions and knowledge of the actions taken by the vehicle 150, if there still seems to be an imminent collision, the processor 210 and/or other systems in the vehicle 150 may prepare the occupants of the vehicle 150 (and the detected object if communication is possible) for the collision by preparing safety devices, as well as reporting an imminent collision to emergency response centers (police, fire, ambulance, and the like). The vehicle 150 (that includes the processor 150, and the like) may then provide updates as needed. However, in the event that the vehicle 150 is not able to communicate after the collision, the initial communication may help ensure that help is on the way.

The processor 210 may work in unison with, for example, other sensors on the vehicle 150 such as the IMU 250 to determine a best course of action. The vehicle 150 may also receive/transmit various sensor data from/to other vehicles (not shown) and/or objects (including the house 160) in the area, as well as to a cloud (not shown) that may comprise servers and/or sensors to keep track of traffic in an area.

If the platform 200 is the house 160, the processor 210 may take appropriate actions via the communication interface 240 as discussed above with respect to FIG. 1C. The house 160 may also communicate via the communication interface 240 with the police if it is determined that appropriate security or other action is needed due to objects/person(s) sensed in the vicinity of the house 160.

The platform 200 may also download a database of objects that can be used as a starting point for recognition of objects. For example, the database may be used to generally distinguish cats, dogs, humans, vehicles, and the like. The platform 200 may also learn to distinguish similar objects from each other. For example, the size of a human may help distinguish a human as a child or an adult. Also, as the platform 200 "learns" enough details over time, the shape of the pet(s) belonging to the house 160 may be distinguished from other pets in the neighborhood and/or wild animals. The platform 200 may use, for example, motion of the objects (change in shape as, for example, a pet moves) to distinguish one object from another.

The platform 200 may also use other databases to help determine what an object is. For example, the vehicle 150 may use a map/location database to identify a human shape in a street as a statue.

Figure 3:
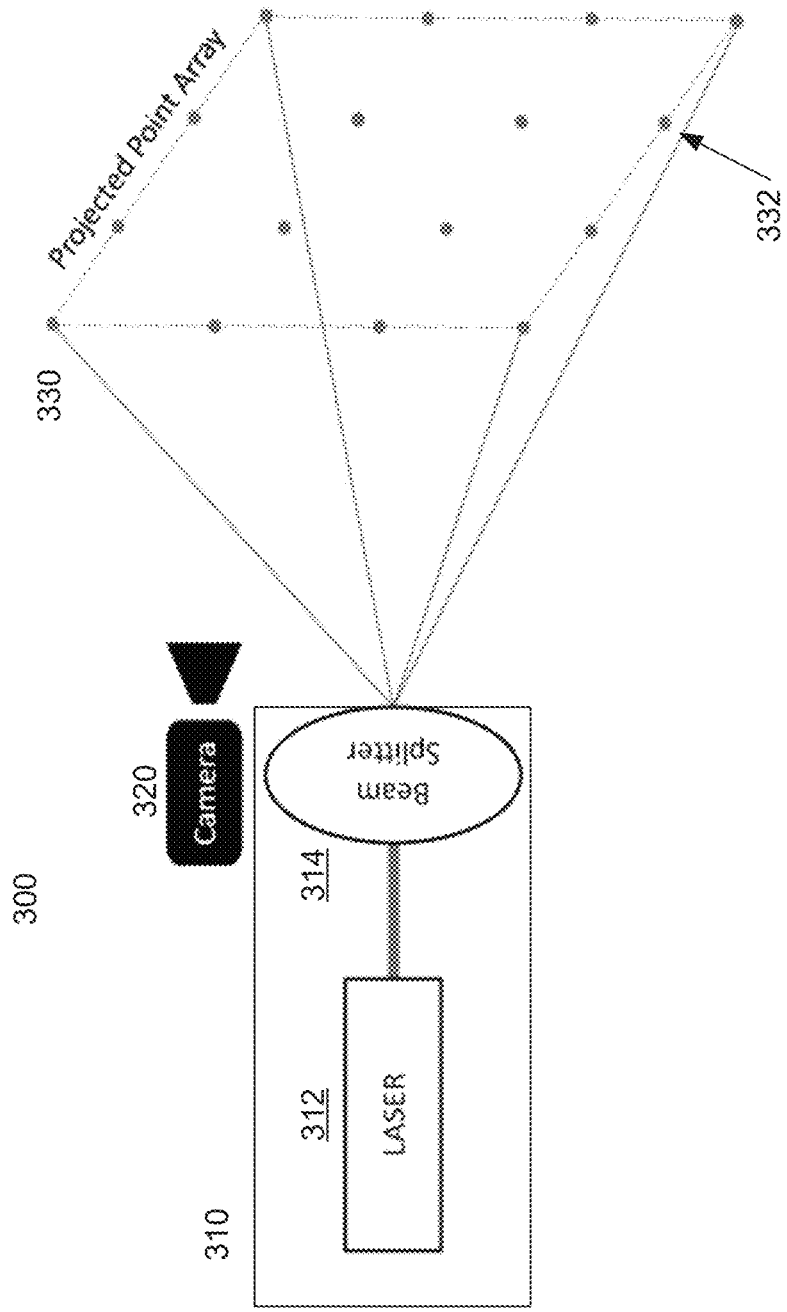
FIG. 3 is an illustration of a laser device used in projecting an array of light shapes for detecting objects, in accordance with an embodiment of the disclosure.

FIG. 3 is an illustration of a laser device used in projecting an array of light shapes for detecting objects, in accordance with an embodiment of the disclosure. Referring to FIG. 3, there is shown a shape detection device 300 that may be similar to the shape detection device 110. The shape detection device 300 may comprise the light source 310 and the camera 310. The light source 310 may comprise, for example, a laser 312 and a beam splitter 314.

The laser 312 can emit laser beam to the beam splitter 314, which then splits the single laser beam into multiple laser beams. Accordingly, the output of the beam splitter 314 may be an array 330 of output laser beams 332 (light circles). The beam splitter 314 may be configured to be able to output a desired number of laser beams in a desired array configuration. For example, the array 330 may be a 4×4 array of output laser beams 332, where each output laser beam 332 is circular in shape. However, as explained previously, the output laser beam 332 may comprise different sizes and/or shapes to identify one or more specific output laser beam 332. In order to increase power of each output laser beam 332 in the array 330, there may be multiple lasers 312. The beam splitter 314 may also limit the size of the array 330 to keep the power of each output laser beam 332 at a higher level.

The laser(s) 312 and/or the beam splitter 314 may be controllable to be able to adjust the size of the array 330 and the power of the output laser beam 332. Various embodiments may be able to steer the output laser beams 332 to different parts of the array 330, increase/decrease the density of the output laser beams 332 in the array 330, and/or change the size of the array 330. For example, the size of the array 330 may be measured at a fixed distance from the output of the shape detection device 300. The laser(s) 312 and/or the beam splitter 314 may also be controllable to pulse the output laser beam 332 to take into account, for example, variations in ambient light during the day/night, as well as other variables. A variable may be, for example, the average power output by the light source 310.

The size of the array in dimensions, size of the light shapes, density of the number of light shapes in the array, intensity of each light shape, shape of each light shape, pulsing, and the like, may each be controllable dynamically (such as in real time) as needed for different environment factors (weather, brightness of ambient light, specific functional modes at a given time for the shape detection device 300, and the like). For example, for the vehicle 150, the dynamic change to the array of light shapes and its characteristics may be automatic and depend partially on the speed of the vehicle 150 and/or the traffic/pedestrian/animal, and the like, density. The change to the array and/or light shapes and its characteristics may also be manually set.

The array of light shapes may be projected constantly or may be pulsed, where the pulsing frequency and/or the duration of a pulse on time may be variable depending on some of the environmental factors mentioned. The intensity of the projected light array may be changed, in addition to the environmental factors mentioned, to take into account, for example, the pulsing frequency and pulse duration. For example, lower pulse frequency and/or shorter pulse duration may have a higher intensity. Additionally, the intensity of the light shapes may be increased, for example, when the number of light shapes in an array increases. The light shapes may also be changed, for example, as the pulse frequency, pulse duration, and/or the intensity changes. As a non-limiting example, the array of light shapes may be pulsed during daytime hours. As it gets darker, the weather more inclement, the traffic busier, and the like, the pulsing frequency may be increased, including to a constant projection of the array of light shapes.

The array of light shapes may be controlled, for example, by changing the focal length of the projected array. The focal length may be changed using electronic and/or mechanical methods. Change in the focal length may be used, for example, to control the density of light shapes, size of the light shapes, and pitch of the light shapes. The intensity of the light shapes in the array may also be changed to allow for a comprehensive ratio of light shape sizes to intensity of the light shapes.

The camera 320 may be configured to point, for example, along the same direction as the center of the array 330. Accordingly, the camera 320 may be able to receive reflected light from the output laser beams 332. The detected light may then be processed by, for example, the processor 210. The processing may compensate for skewing of the shape of, for example, the circular output laser beams 332. An output laser beam 332 that is at an edge of the array 330 may be skewed, for example, because it is not being projected parallel to the output laser beams 332 that are at or near the center of the array 330.

Additionally, an output laser beam 332 may be detected as a non-circular shape when it is reflected by a surface that is not perpendicular to the direction of travel of the output laser beams 332. For example, the output laser beam 332 may hit an edge of an object, or the reflective surface may be at an angle. FIGS. 4A-4E will show some instances of reflective surfaces that may result in a non-circular light pattern.

FIG. 4A is an example of detecting a perpendicular flat surface, in accordance with an embodiment of the disclosure. Referring to FIG. 4A, there is shown a detected light shape 402 that is circular. Accordingly, it may be inferred that the detected light shape 402 has reflected off a surface that is perpendicular to the direction of travel of an output laser beam 332. The diameters D1 and D2 may be used to determine whether the surface is perpendicular to the direction of travel. For example, if D1 is equal to D2, the surface can be determined to be perpendicular to the direction of travel, and the diameter D1 and/or D2 may be used to determine the distance to the surface. There may be more than 2 diameters used to more accurately determine whether the reflected shape is circular.

FIG. 4B is an example of detecting a corner of a flat surface, in accordance with an embodiment of the disclosure. Referring to FIG. 4B, there is shown a detected light shape 404 that is circular except for an area that is missing in the top, right corner. Accordingly, it may be inferred that the detected light shape 404 has reflected off a surface that is perpendicular to the direction of travel of an output laser beam 332 except that a part corresponding to the upper right portion of the detected light shape 404 is missing. This may be, for example, due to a notch or a missing corner portion of the surface. The axes D1 and D2, which may be diameters in some cases, may sometimes be used to generally detect information about the surface, including possibly a distance to the surface. There may be one axis or multiple axes used to determine various characteristics of the surface. The axes used may also be at different angular positions than shown.

FIG. 4C is an example of detecting an edge of a flat surface, in accordance with an embodiment of the disclosure. Referring to FIG. 4C, there is shown a detected light shape 406 that is circular except for the top area that is missing. Accordingly, it may be inferred that the detected light shape 406 has reflected off a surface that is perpendicular to the direction of travel of an output laser beam 332 except that there is an edge that runs horizontally across the detected light shape 406. The axes D1 and D2, which may be diameters in some cases, may sometimes be used to generally detect information about the surface. There may be one axis or multiple axes used to determine various characteristics of the surface. The axes used may also be at different angular positions than shown.

FIG. 4D is an example of detecting a flat surface slanting with respect to the detecting device, in accordance with an embodiment of the disclosure. Referring to FIG. 4D, there is shown a detected light shape 408 that is elliptical with a horizontal major axis D1 and a vertical minor axis D2. Accordingly, it may be inferred that the detected light shape 408 has reflected off a surface that is slanted with respect to the direction of travel of an output laser beam 332 such that one of the left side or the right side is closer to the camera 320 than the other side. The chords C1 and C2, which may be equidistant from the minor axis D2, may be used to determine whether the surface is slanted such that one side is closer to the camera 320 than the other side. For example, as shown, when chord C2 is longer than chord C1, the left side of the surface may be closer to the camera 320 than the right side of the surface.

FIG. 4E is an example of detecting a perpendicular flat surface with a portion of the flat surface slanting with respect to the detecting device, in accordance with an embodiment of the disclosure. Referring to FIG. 4E, there is shown a detected light shape 410 that is circular except for a portion to the right of the line 411. Accordingly, it may be inferred that the detected light shape 410 to the left of the line 411 has reflected off a surface that is perpendicular to the direction of travel of an output laser beam 332, while the portion to the right of the line 411 has reflected off a surface that slants with respect to the camera 320. The width W may be used to determine an angle between the perpendicular surface and the slanting surface.

While not all possible shapes or orientations of a detected light have been shown, it may now be understood that various edges and orientation can be detected by analyzing a shape of the reflected light. Additionally, analyzing the relative intensity of various portions of the reflected light may indicate a reflectivity of the object. The texture may be indicated, for example, by the shape of the detected light at the circumference. For example, if the circumference is smooth, then that may be an indication of a smooth edge.

Additionally, as the vehicle 150 travels down a road, it moves relative to the road as a result of its direction and speed changes, as well as road conditions. The vehicle's ego-motion may be quantified by sensors such as, for example, accelerometer(s) and gyroscope(s), to anticipate how the array 330 of light circles will deform. For example, the vehicle 150 turning to the right will affect the array of light circles differently than the vehicle 150 turning to the left, braking, or accelerating. Once this effect is quantified, the results can be used to fine tune and correct the sensor's calculations. Similarly, motion changes of the vehicle 150 with respect to the road can be calculated visually by using deformation of the array 330 without the need for mechanical sensors. It could work both ways.

Accordingly, the detected lights may indicate a shape of the object that the output laser beams 332 (light circles) have reflected from. The processing of the detected light may be performed by, for example, one or more of the processors 210.

It can be seen that with various embodiments of the disclosure, if a light circle (or other appropriate shape) is projected onto a surface, the form of this light circle will depend upon the orientation of the surface. For perpendicular surfaces, the light circle will be circular in form. For angled surfaces, the light circle will generally be elliptical in form. Coupled to a single camera, this deformation may be quantified to be able to calculate the specific surface angle. Furthermore, if the light circle is projected over an edge, part of it will consist of a straight line that is distinguishable from both circles and ellipses, thus clearly suggesting an edge is present. The orientation of the line will indicate the direction of the edge. If a light circle is projected into a corner, the form it will take may be similar to a heart shape, which is also distinguishable from circles, ellipses, and straight lines. The orientation of the heart will indicate the direction of the corner. Using a projected light circle in such a way enables differentiation between perpendicular and angled surfaces, as well as, edges and corners.

The form of the light circle may change in size proportionally to the distance between the projector/camera and the object. The exact ratio may be measured and used in a software algorithm as a constant. Accordingly, the light circles may be smaller for closer objects and larger for farther objects. In some embodiments, the projection of the light circle may be adjusted to allow for greater spreading out of the light circle with distance in order to better estimate distance. Therefore, some embodiments of the disclosure may alternate projection of light circles for distance to an object with projection of light circles for identifying the shape of that object. The ratio of projecting light circles for distance versus identification may vary as needed. Other embodiments may not have separate "frames" for projecting light circles for distance versus identification.

Various embodiments may use, for example, distance between adjacent light circles or a size of the entire light array to determine distance to an object.

The specific form of the light circle may be processed with, for example, a software algorithm and a representative outline can be extracted. As part of this process, the light circle's edges may be observed as an indicator of surface roughness. The "cleaner" (or more regular) the light circle, the smoother the surface.

If an array of light circles is projected, much more information may be gathered about the environment and the objects therein. In addition to observing the form variations of individual light circles, the proximities change as a whole on the array level may also be observed. An increased number of light circles may also yield a better sensing resolution. The relationship between the light circles will change according to how far the object is from the projector. Tighter light circle spacing may mean closer objects and looser light circle spacing means farther objects. When angled surfaces are introduced, the light circle pattern changes accordingly and may be representative of a perspective. Similarly, light circles that are tighter are closer together on the angled surface and light circles that are looser are farther apart. Accordingly, using a single camera, the point-to-point proximity may be calculated to derive an object's distance and angle.

As the projector moves, a scanning effect may be generated that produces infinite depth information for everything around the projector, even though only a fixed number of light circles may be used. Motion may enable the pattern to cover all that it is projected over. This effect may produce a virtual and readable structured-light "fabric" that drapes in real-time over all surrounding objects. If all the light circles are connected, a resultant surface representation may emerge with contour approximations. In this way, a 3D map may be generated using only a 2D projection. As the light circles move around, there may be noticeable change in direction to reveal surface orientations, features, edges, and corners. This behavior is in accordance with light circle and array deformations mentioned above, which may be used to create a machine vision system in whole or in part. These concepts may continuously validate each other to offer a certain redundancy and fault tolerance. Combined with methods to derive object distance and angle as mentioned above, this vision system may also be capable of localizing itself on a map, as well as, determining position and direction of objects it sees.

Figure 5:
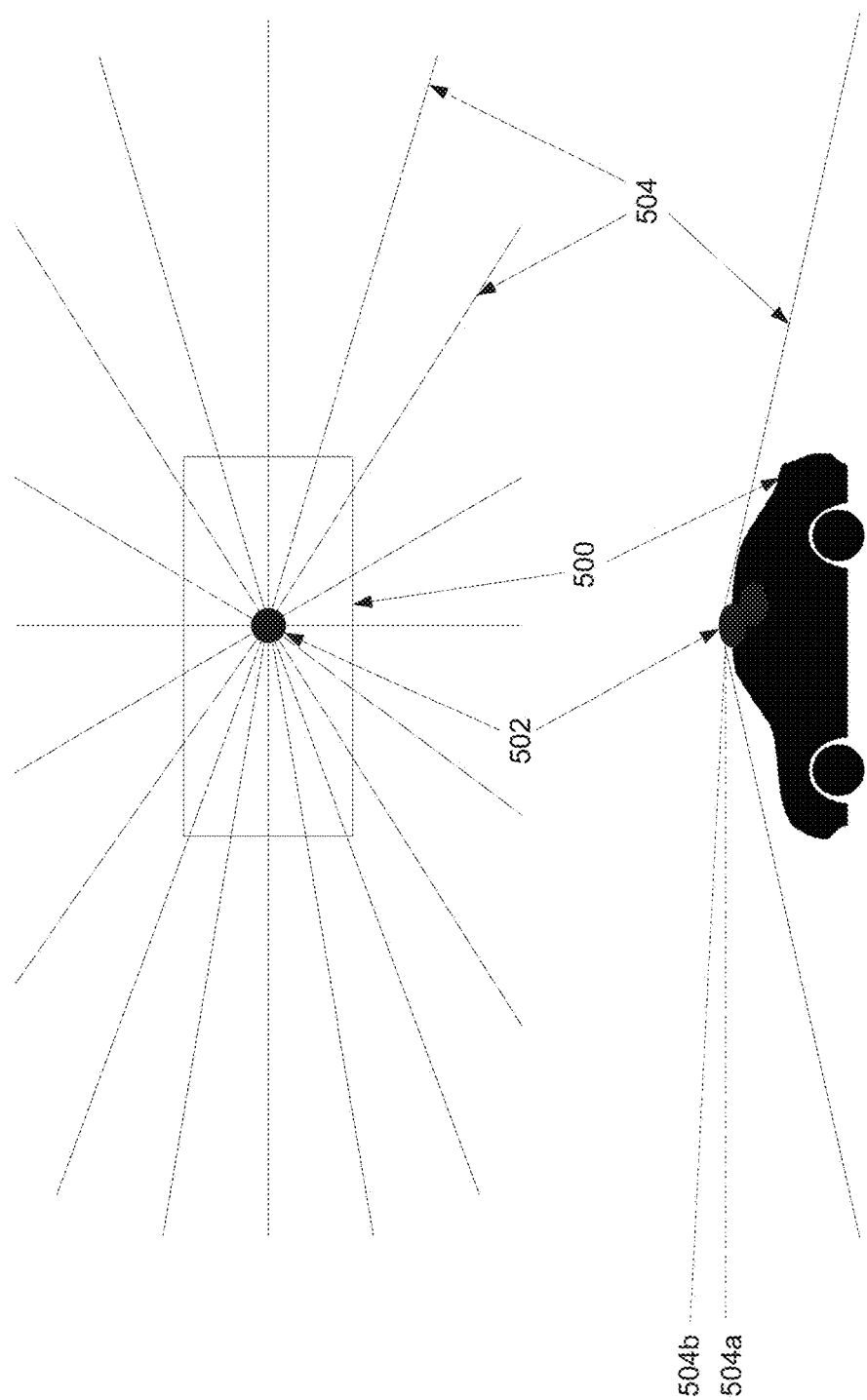
FIG. 5 is an example of arrays projected 360 degrees around an object, in accordance with an embodiment of the disclosure.

FIG. 5 is an example of arrays projected 360 degrees around an object, in accordance with an embodiment of the disclosure. Referring to FIG. 5, there is shown a top view of the vehicle 500 and a side view of the vehicle 500. The vehicle 500 may be similar to the vehicle 150. With respect to the top view and the side view the vehicle 150, there is shown the shape detection device 502 that may be similar to the shape detection device 110. The shape detection device 502 may project arrays of light circles (or other light shapes) around the vehicle 500. As can be seen in the top and side views, the projected arrays (represented by the lines 504) may be to different distances from the vehicle 500 depending on the desired range for the different directions around the vehicle 500. However, various embodiments need not be limited so. For example, depending on the embodiment, or an environment the vehicle 500 is traveling in (type of road, traffic density, speed, weather, and the like) the number of arrays projected (angular density) may vary in different directions as well as the distance of the arrays projected in different directions.

The arrays may be projected by a light source similar in functionality as, for example, the light source 112, for the area desired (360 degrees or an angular area less than that). There may be one light source or multiple light sources depending on the embodiment. The light source(s) may use moving parts or beam steer the lights. The detection may be performed by a detector similar in functionality as, for example, the detector 114. Depending on the embodiment, there may be a single detector used or multiple detectors used.

A distance that an array is projected may be limited, for example, by the array hitting the road surface. Accordingly, a maximum distance projected may be projecting an array parallel to the road surface as shown by 504a. An array may also be projected at an angle above a line parallel to the road surface as shown by 504b. The projection at an angle above parallel may be in cases such as, for example, where the vehicle 500 is traveling downhill and the road goes uphill a short distance away.

Accordingly, the shape detection device 502 may adjust in real time various configurations of the projected arrays such as, for example, the size of the projected array, the light shapes in the projected array, the angle of projection of the array, the intensity of the projected array, and the like.

While the vehicle 500 has been described as projecting the arrays of light circles in 360 degrees, other objects may also perform similarly. For example, a home may have a shape detection device 502 located on a roof (or other suitable location) to provide 360 degree "view" of the area around the home. Other stationary and mobile objects may also use 360 degree shape detection technology disclosed herein. Additionally, some mobile/stationary objects may project arrays in a volume (sphere, and the like.). These are disclosed in more detail with respect to FIGS. 6A and 6B.

Figure 6A:
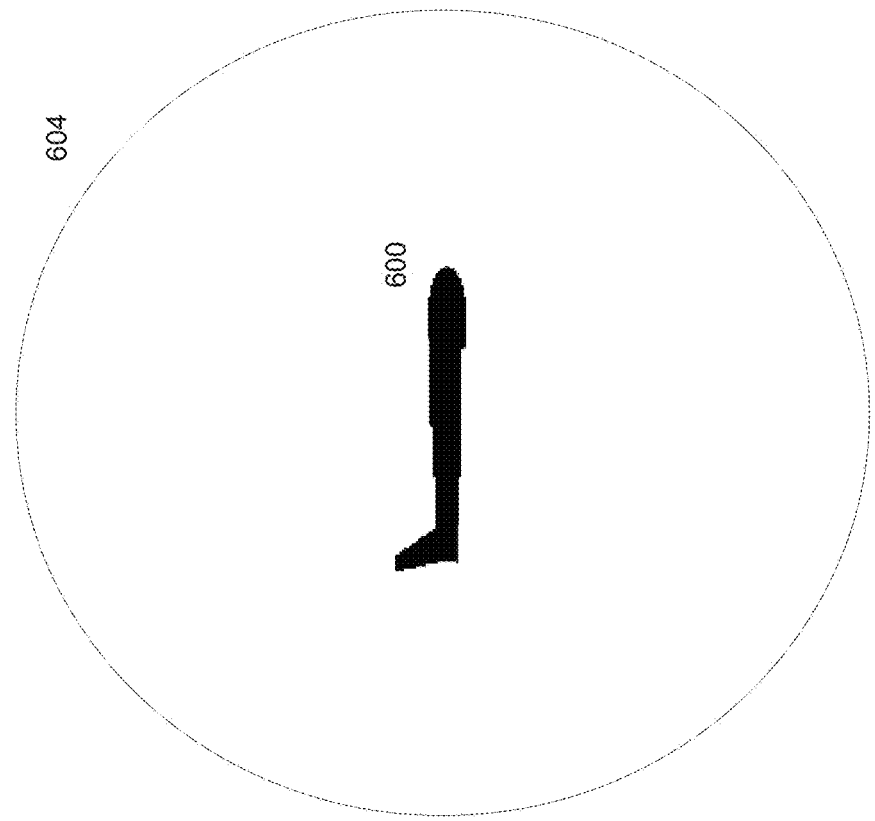
FIG. 6A is a top view of an example of multiple sensor/projector beacons that create a protective sensor surround bubble projected all around a mobile object, in accordance with an embodiment of the disclosure.
Figure 6B:
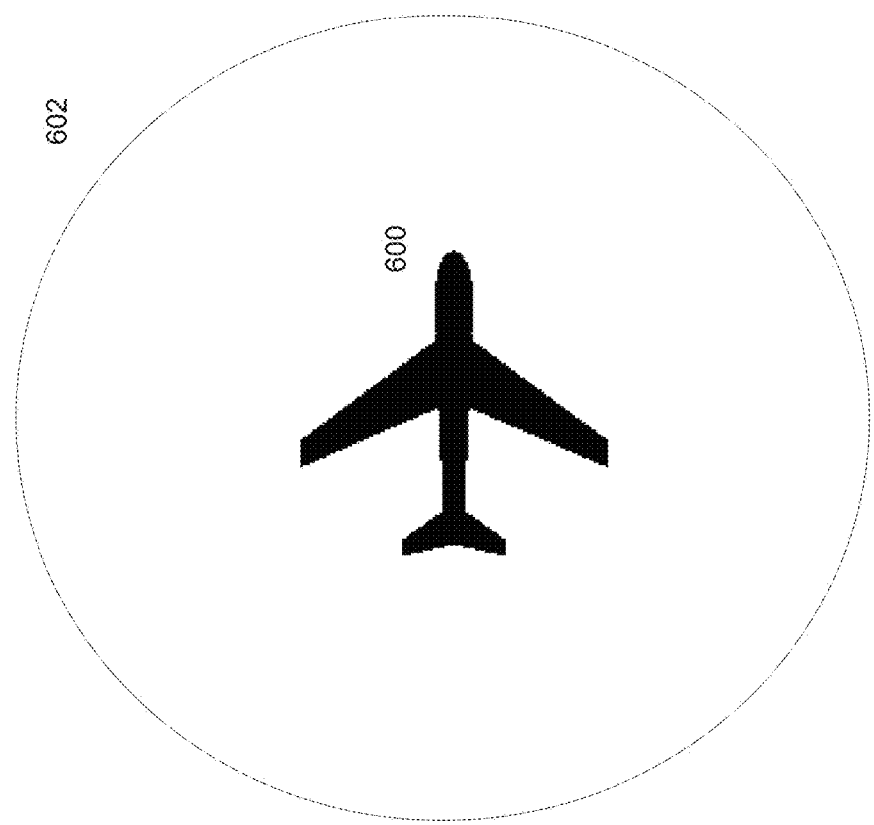
FIG. 6B is a side view of an example of multiple sensor/projector beacons that create a protective sensor surround bubble projected all around a mobile object, in accordance with an embodiment of the disclosure.

FIGS. 6A and 6B show an example of multiple sensor/projector beacons that create a protective sensor surround bubble projected all around a mobile object, in accordance with an embodiment of the disclosure. Referring to FIGS. 6A and 6B, there are shown a top view of an airplane 600 and a side view of an airplane 600. The circles 602 and 604 indicate projection of light circles (or other light shapes) around the airplane 600. Accordingly, the arrays of light circles may be projected in a sphere shape around the airplane 600. The arrays of light circles may also be projected in other volume shapes such as, for example, an ellipsoid. However, for ease of discussion, the volume shape will be assumed to be a sphere.

There may be a plurality of shape detection device 110 located around the airplane 600 to project light circles in a sphere around the airplane. For example, there may be a shape detection device 110 on an upper surface of the airplane 600 and a lower surface of the airplane 600, or at the nose of the airplane 600 and at the tail of the airplane 600, or at the ends of each wing of the airplane 600. The number of the shape detection device 110 used may depend on an embodiment. Each of the shape detection device 110 may be individually controlled as described previously to project in certain areas/regions around the airplane 600, and also turned on or off as needed. For example, the airplane 600 that is taxiing on the ground may not need to project arrays to the ground directly underneath and/or directly above the airplane 600.

Additionally, while the projection of arrays in a volume has been discussed with respect to airplanes, various embodiments may be used on other types of airborne/spaceborne vehicles, as well as land based vehicles like the vehicle 150 or 500. Various embodiments of the disclosure may also use the shape detection device 110 to project arrays all around (or partially around) a stationary object, as shown with respect to FIG. 7.

FIG. 7 is an example of arrays projected all around a stationary object, in accordance with an embodiment of the disclosure. Referring to FIG. 7, there is shown a tower 700 with a shape detection device 702 that may be similar to the shape detection device 110. The shape detection device 702 may be used to monitor an area for various objects that may intrude within the land space and/or airspace. While the tower 700 is shown, various embodiments need not be so limited. For example, the shape detection device 702 may be placed on a building, house, a light pole, and the like.

Figure 8:
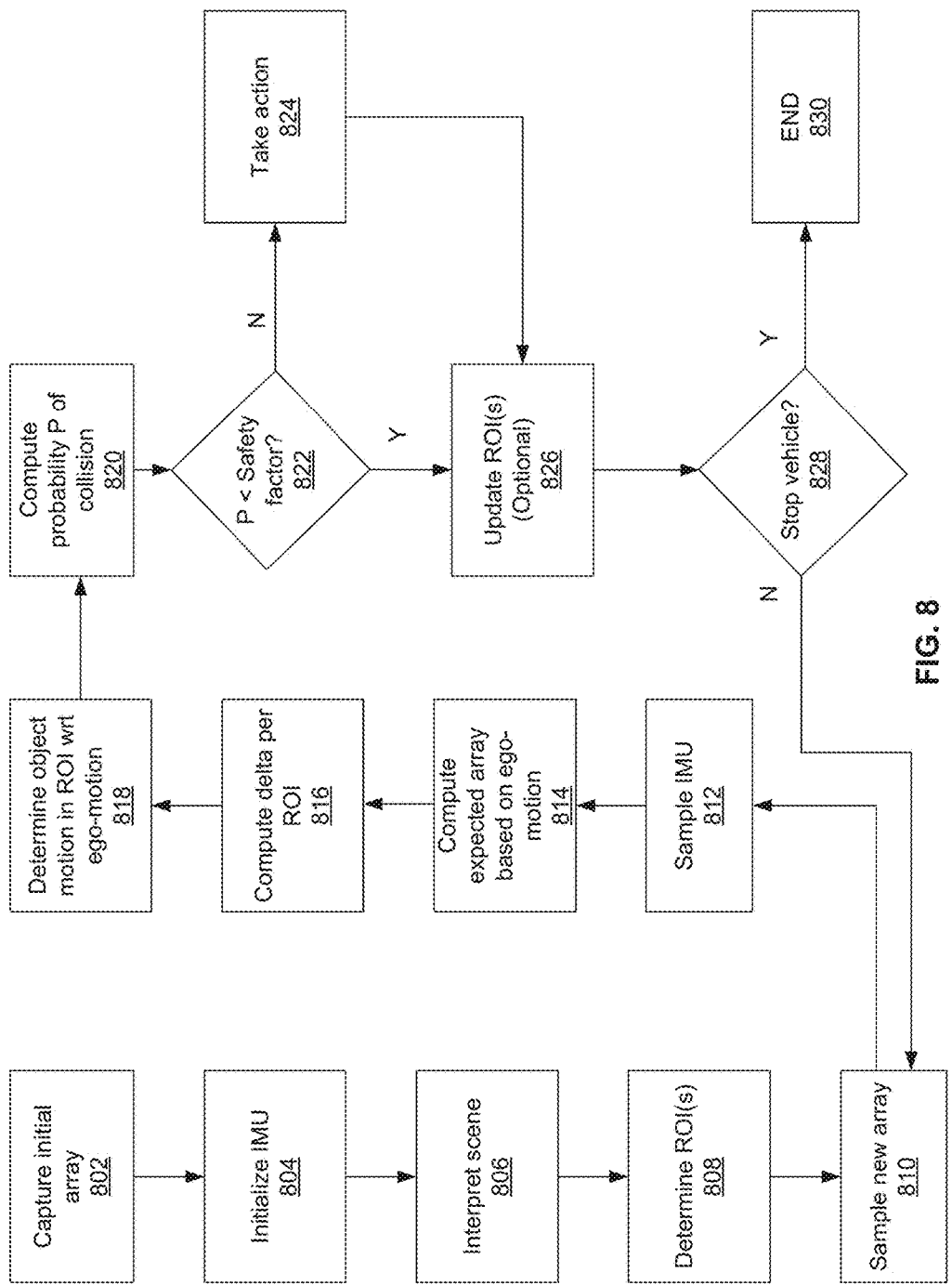
FIG. 8 shows an example flowchart for using an array of light circles, in accordance with an embodiment of the disclosure.

FIG. 8 shows an example flowchart for using an array of light circles, in accordance with an embodiment of the disclosure. Referring to FIG. 8, at 802 an initial array of light circles is projected and detected by a vehicle such as, for example, the vehicle 150. The detected light circles may be processed to determine objects that the light circles reflected from. The objects may be determined, for example, using a library stored in the vehicle 150 and/or library (libraries) in the cloud or other objects as explained previously. At 804, an inertial measurement unit (IMU) may be initialized with the detected objects. The IMU may comprise, for example, one or more accelerometers and/or one or more gyroscopes/gyrometers. At 806, the detected objects are interpreted as a scene. For example, the detected objects may be a car in front and/or to the side of the vehicle 150, a tree to the right of the road, a child standing near the road on the left hand side of the road, a ball rolling toward the road from the right hand side, and the like.

At 808, various regions of interest (ROIs) may be determined. For example, the car immediately in front of the vehicle 150 may be labeled as ROI1, an area to the left and front of the vehicle 150 may be labeled as ROI2 because of the child who may move in front of the vehicle 150, and an area to the right and front of the vehicle 150 may be referred to as ROI3 because the ball may roll in front of the vehicle 150. The ROIs may be determined to be those areas around objects where an object may affect the vehicle 150 during its normal transit on the road. The ROIs may be kept as a map of the environment around the vehicle 150. Additionally, other stationary objects may also be kept in the map of the environment.

At 810, a new sample of the projected array of light circles may be acquired. The sampling period of the array of light circles may vary depending on various conditions such as, for example, the weather, condition of the road, speed of the vehicle 150, speed of the neighboring vehicles, whether it's in the city or the country, and the like. For example, in cases where the environment is relatively empty (not much traffic or pedestrians, and a clear, dry day), the sampling period may be fixed at one period of time. But when a car turns in front of the vehicle 150, the sampling period may increase to keep better track of the car in front.

Various embodiments may sample a constant projection of array of light circles. However, an embodiment need not be so limited. For example, the array of light circles may be projected periodically and detection of the reflected light may be coordinated with the projection time. Accordingly, different schemes may be used for projecting arrays and detecting the projected arrays.

At 812, the IMU may provide a latest information. The information from the IMU, as well as possibly other information (such as, for example, speed of the vehicle, and the like) may be used to determine ego-motion for the vehicle 150, including its speed and location.

At 814, the vehicle 150 may then generate an expected array of lights circles based on the previous array(s) of light circles and the calculated ego-motion. For example, if the car in front and the vehicle 150 had been traveling at the same speed, then the expected ROI for the car ahead would not be expected to change.

At 816, the ROIs in the next sampled array of light circles may be compared to the ROIs in the expected array of light circles to determine a delta for each ROI with respect to the expected array. The delta may be determined by, for example, comparing homogeneity of light circles in the ROI from frame to frame to the expected array of light circles, such as light circle average size, or distance between light circles, and the like. The delta may also depend on, for example, rotation of the ROI and/or shift along X-axis and/or Y-axis (and/or Z-axis). The delta may also depend on a scale factor that may indicate distance. For example, a back window of the vehicle ahead may be at a different distance than a vertical surface of the trunk. Accordingly, the delta may need to take into account the different distances to the different parts of an object in an ROI to make sure delta comparisons are made for corresponding parts of the object from one frame to another or to the expected frame.

At 818, the motion of an object in an ROI may be determined with respect to the ego-motion of the vehicle 150. For example, if the delta indicates that an object in the ROI is closer than expected, then the vehicle 150 needs to determine if the unexpected delta is due to the action of the object in the ROI or the vehicle 150. This may be determined, for example, by using other sensor information (the IMU, as an example) as well as comparing the motion of objects in the various ROIs to known stationary objects. For example, the ego-motion of the vehicle 150 may be compared to a tree that is in the environment map for the vehicle 150.

The relative motion of the vehicle 150 and the tree may be compared to the relative motion of the vehicle 150 to the car in front of it. If the relative motion of the vehicle 150 and the tree is the expected motion, then it may be concluded that the car in front of the vehicle 150 has slowed down unexpectedly. However, if the relative motion of the vehicle 150 and the tree is greater than the expected motion, the vehicle 150 may have sped up unexpectedly.

At 820, the motion of the objects in the ROIs may then be used to determine a probability P of collision if the present velocity is maintained. The determination of the probability P may take into account, for example, the ego-motion of the vehicle 150, a travel history of the object in the ROI, extrapolation of the speed and direction of the object in the ROI, as well as the expected time to collision.

At 822, if the probability of collision is greater than or equal to a safety factor where immediate action must be taken, then action may be taken at 824. Various embodiments may use information from the IMU in determining and/or modifying the safety factor. For example, the IMU detecting deceleration or swerving by the vehicle 150 may be used to adjust the safety factor. The determination of a safety factor may be design and/or implementation dependent, and may vary for different environments.

The action at 824 may comprise alerting the driver/occupant(s) of the vehicle 150, honking the horn to warn the driver of the other vehicle, flashing the headlights and/or taillights (and/or other lights on the vehicle), braking the vehicle 150, and/or steering the vehicle 150 away from the collision vector.

At 826, the state of the ROIs may be optionally updated.

At 822, if the probability of collision is less than the safety factor, then the state of the ROIs may be optionally updated at 826.

At 828, a further determination may be made as to whether the vehicle needs to be stopped. If the vehicle 150 needs to be stopped to avoid a collision, then the vehicle 150 is stopped at a safe area and the current cycle for using the array of light circles ends at 830 until further travel is initiated.

The use of the array of light circles may also continue, for example, by continuously operating even when the vehicle 150 is stopped. For example, this may be the same case as when it is determined at 828 that the vehicle 150 does not need to stop. Then a new array of light circles may be sampled at 810.

Various embodiments of the disclosure may indicate that the vehicle 150 is not moving at 802, 804, 806, and 808. However, an embodiment need not be so limited. For example, when a turn is made by the vehicle 150, the vehicle 150 may not have stopped, but a completely new set of ROIs may need to be identified since the vehicle 150 now has a "new" environment. Accordingly, the actions at 802, 804, 806, and 808 may take place while the vehicle 150 is moving.

Figure 9:
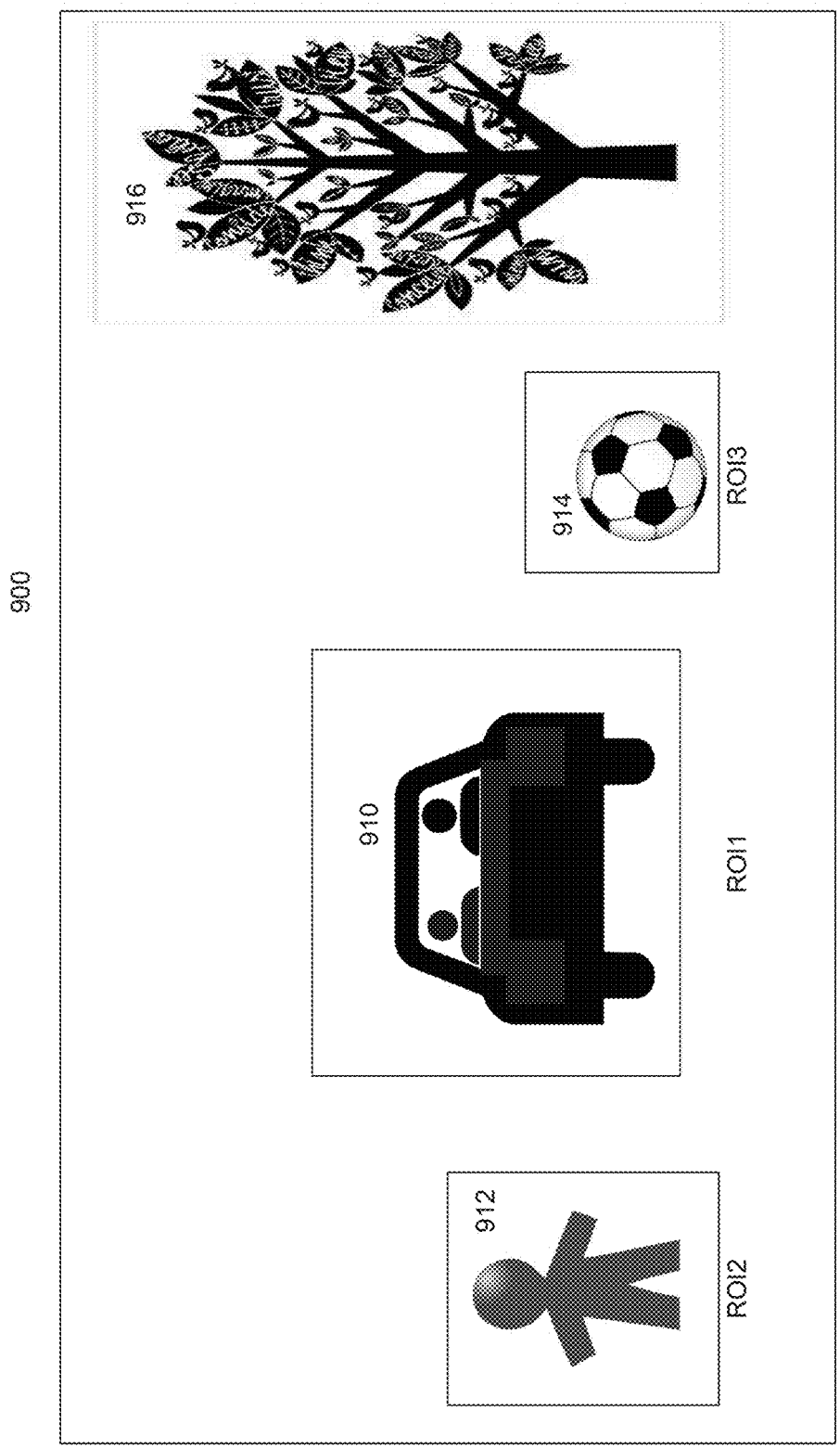
FIG. 9 shows an example of a detection of objects based on detecting a projected array of lights, in accordance with an embodiment of the disclosure.

FIG. 9 shows an example of a detection of objects based on detecting a projected array of lights, in accordance with an embodiment of the disclosure. Referring to FIG. 9, a specific scenario is shown for an embodiment where the array of light circles projected by the vehicle 150 may cover the area 900 in front of the vehicle 150. The vehicle 150 may have detected several objects that are moving or are considered to be important. For example, a child 912 may be recognized on the left side of the area 900, a car 910 may be recognized in the center of the area 900, and a ball 914 may be recognized on the right side of the area 900. Additionally, there may be a tree 916.

Accordingly, the vehicle 150 may determine that the regions of interest (ROIs) are the ROI1 around the car 910, the ROI2 around the child 912, and the ROI3 around the ball 914. The ROI1 may have been determined because the car 910 is a fast moving object. The ROI2 may have been determined because the child 912 can affect the travel of the vehicle 150 if the child 912 moves into the street far enough. The ROI3 may have been determined because the ball 914 is a moving object that can affect the travel of the vehicle 150 if it comes out far enough onto the street. Additionally, there may be a child or a pet that may chase the ball into the street.

Accordingly, the vehicle 150 may actively keep track of the motion and location of objects in the various ROIs.

While the tree 916 may have been identified as an object, it may not be considered a region of interest because it is not moving, nor is it expected to move. However, various stationary objects such as the tree 916 may be kept as part of the map of the environment since they may be useful. For example, as explained with respect to FIG. 8, a stationary object may be used to determine the motion of ROIs with respect to the ego-motion of the vehicle 150. Additionally, the stationary object may need to come into calculation of objects the vehicle 150 may need to avoid if the vehicle 150 needs to make evasive maneuvers.

Various descriptions have referred to the vehicle 150 detecting, keeping track of, determining, and the like, the various objects. It should be noted that this is a generalization for ease of description. Specific tasks are performed by various devices on the vehicle 150 as described with respect to FIGS. 1A-9. It should also be noted that while a platform was described as the vehicle 150, that also was done in the interest of ease of description. Accordingly, as described in this disclosure, a platform may be any type of mobile vehicle (manned or unmanned land vehicle, water vehicle, air vehicle, space vehicle, robots, and the like) or a stationary platform (houses, buildings, structures, and the like).

Accordingly, as described above, the exact positions and relationships of light circles may be unique to different objects and their surfaces. However, with machine learning, it may be possible for a platform to recognize what objects are being viewed, identify these objects (e.g., humans, animals, mobile objects, and the like), and to likewise continually contribute to a data library (or libraries) to enhance and accelerate continuous machine learning. The objects may then be categorized as ROIs in some instances, and the movement of the ROIs may be used to determine actions to be taken to ensure safety of a vehicle, its passengers, as well as those around the vehicle.

In another example, speed bump detection has been a significant challenge for today's computer vision systems. Projected light circles may offer a rather straightforward solution as speed bump width and height could be characterized by the representative light circle distortions it incurs. By quantifying this physical effect, more effective virtual drivers may be created for vehicles that may better deal with related tasks such as detecting the ground plane, and even performing variation analysis to determine how much the drive path undulates. Similar may also be true for potholes in the road as well. The condition of a driving surface may be estimated by observing the plane discontinuity that would be representative of the pothole's size.

Another challenge for computer drivers has been detecting objects like plastic bags and thus preventing the vehicle from unnecessarily slamming on its brakes. As an array of light circles is captured on the floating bag, the platform may detect violent shape changes unlike anything else in the scene. Such sudden changes in an object's size give away its low mass. According to the Newton's Laws of Motion, heavier objects would require more time to change direction. Therefore, the object's inertia and momentum may also be inferred from this observation.

It can be seen that various embodiments of the disclosure can be used in many applications to sense the surrounding area, analyze the sensed signals, and generate responses as needed. The response may be, for example, taking evasive maneuvers, notifying other platforms/devices/people of what was sensed/analyzed/responded to, as well as receiving from others similar information. Thus, the effective area covered for the sense/analyze/respond scheme can be greatly increased and performed quickly. The information can also be shared directly with other consumers of sensor information such as, for example, other vehicles, or via third party platforms, or the Internet/cloud. Accordingly, various objects (mobile and stationary), condition of the roads, traffic on the roads, in the air, and/or the water may be recognized and kept track of over time, and correct responses may be made as needed.

An embodiment of the disclosure may comprise a projecting device, located at a platform, which projects an array of light shapes. Reflections of the light shapes from at least one object in a projection path of the light shapes may be detected. The reflections may be processed to determine at least one of a distance from the platform to the object, an orientation of the object, an edge of the object, and a corner of the object. The object may then be identified by the results of the reflections.

A first library of shapes may be maintained, where each shape in the first library corresponds to at least a portion of the array of light shapes reflected from a corresponding object. The fiducial points of the reflections may be matched to a shape in the first library of shapes to identify an object.

In identifying an object, corresponding primary shapes may be found in the first library, where the primary shapes are shapes that match a target reflection to at least a pre-determined first threshold matching score. When there are no primary shapes in the first library, secondary shapes may be found in the first library, where the secondary shapes are the shapes that match a target reflection to at least a pre-determined second threshold matching score that is lower than the first threshold matching score. The validity of the secondary shape with a highest matching score may be verified. Verification may, for example, vary depending on the secondary shape. For example, if the secondary shape is a simple shape, the validity of the secondary shape may be routine. However, if the shape is complex, various reflections may need to be used to validate the secondary shape. This may be because the reflection being verified may match to many different shapes.

When there are no primary shapes and no secondary shapes in the first library, the reflections may be matched to a second library of shapes, where the second library of shapes may be, for example, in a cloud server.

A map of an environment around the platform may be generated using the identified objects.

Another embodiment of the disclosure may include a platform with a detection system that has a projecting device configured to project an array of light shapes, and a light detector configured to detect reflections of the light shapes from at least one object in a projection path of the light shapes. The detection system may also comprise a processor that is configured to process the reflections to determine one or more characteristics such as, for example, a distance from the platform to the object, an orientation of the object, an edge of the object, and a corner of the object. The processor may then be able to identify the object from the determinations.

The processor may be able to identify the object by matching fiducial points of the reflections to a shape in a library of shapes. The library may be a first library of shapes where each shape corresponds to at least a portion of the array of light shapes reflected from a corresponding object. The processor, in identifying the object, may be configured to find primary shapes in the first library that match the reflections, where a primary shape is a shape in the library that matches a reflection to at least a pre-determined first threshold matching score. The scoring of the match may be using, for example, a pre-determined algorithm. The specific algorithm may depend on a design and/or implementation.

When there are no primary shapes in the first library, the processor may be configured to find secondary shapes in the first library that match the reflections to at least a pre-determined second threshold matching score lower than the first threshold matching score.

The processor may also verify validity of the secondary shape with a highest matching score.

Where are no primary shapes and no secondary shapes in the first library, the processor may be configured to match the reflections to a second library of shapes, where the second library of shapes may be, for example, in a cloud server.

The processor may then generate a map of an environment around the platform using the identified objects.

Still another embodiment may comprise projecting an array of light shapes by a projecting device located at a vehicle, and creating a map of an environment around the vehicle by identifying objects using reflections of the light shapes from at least one object in a projection path of the light shapes. Regions of interest (ROI) may then be determined from the map, and an expected map may be generated for at least one ROI. Comparisons may be made of a latest map of the at least one ROI to the expected map. If the comparison shows a difference greater than a threshold difference, adjustment may be made for controlling at least one function of the vehicle.

Creating the map may comprise, for example, using an inertial measurement unit (IMU). Ego-motion information of the vehicle may be used to determine the expected map. The comparison may be used to generate a probability P of collision with an object for at least one ROI. The probability P may then be compared to a safety factor. If the probability P is greater than the safety factor, then one or more of the following may be performed: alerting an occupant of the vehicle, honking a horn of the vehicle, flashing headlights of the vehicle, flashing tail lights of the vehicle, braking the vehicle, and changing a direction of the vehicle.

Various parts of the various embodiments of the disclosure may be written as computer programs and may be implemented by processors that execute the programs using a non-transitory computer-readable recording medium. At least some of these parts may also be implemented by hardware circuitry.

Non-transitory computer-readable recording medium may include, for example, magnetic storage media (e.g., ROM, floppy disks, hard disks, and the like), optical recording media (e.g., CD-ROMs, or DVDs), FLASH drives, and the like.

As can be seen, an embodiment of the disclosure may have a configuration in a range from a single light source and a single detector to multiple light sources and/or multiple detectors; fixed or controllable to scan; and the light source(s) and/or the detector(s) may use one or more wavelengths of light.

While various embodiments of the disclosure have been described with reference to the figures, it will be understood by those of ordinary skill in the art that various changes in form and details may be made therein without departing from the spirit and scope of the disclosure as defined by the following claims. Accordingly, the above embodiments and all aspects thereof are examples only and are not limiting.

What is claimed:

1. A method, comprising:
    projecting, by a projecting device located at a platform, an array of light shapes, wherein each of the light shapes has a geometric shape that does not overlap with any other of the light shapes within an operating range of the projecting device;
    detecting, as reflected light shapes, a plurality of the light shapes reflected from an object in a projection path of the light shapes;
    processing the reflected light shapes to determine at least one of: distance from the platform to the object, orientation of the object, an edge of the object, and a corner of the object;
    identifying the object by results of the processing;
    maintaining a first library of shapes, wherein each shape in the first library corresponds to at least a portion of one of the light shapes,
    identifying comprises correlating fiducial points of one of the reflected light shapes to a shape in the first library of shapes; and
    in identifying the object, finding corresponding one or more primary shapes in the first library, wherein the primary shape is the shape that matches a target reflected light shape to at least a first threshold matching score.

2. The method of claim 1, comprising, when there is no primary shape in the first library, finding corresponding one or more secondary shapes in the first library, wherein the secondary shape is the shape that matches the target reflected light shape to at least a second threshold matching score that is lower than the first threshold matching score.

3. The method of claim 2, comprising verifying validity of the secondary shape with a highest matching score.

4. The method of claim 2, comprising, when there is no primary shape and no secondary shape in the first library, matching the reflected light shape to a second library of shapes.

5. The method of claim 1, comprising generating a map of an environment around the platform using the identified object.

6. The method of claim 5, comprising:
    determining regions of interest (ROI) from the map;
    generating an expected map of at least one ROI, wherein, when the platform is a mobile platform, ego-motion information of the platform is used for the expected map;
    comparing a latest map of the at least one ROI to the expected map; generating, using the comparison, a probability P of collision by the platform with an object in the at least one ROI; and performing, when the probability P is greater than a safety factor, one or more of: alerting an occupant of the platform, alerting the object in the at least one ROI, and controlling the platform to avoid the object in the at least one ROI.

7. The method of claim 1, comprising changing a characteristic of the array of light shapes by one or more of:
   changing dimensions of the array;
   changing a size of at least one of the light shapes;
   changing a density of the light shapes in the array;
   changing a wavelength for at least one of the light shapes;
   changing, for at least one light shape, to a different geometric shape;
   changing whether the lights shapes are projected continuously or are pulsed; and
   changing an intensity of at least one of the light shapes.

8. The method of claim 1, comprising operating the array of light shapes in one of detecting mode or tracking mode.

9. The method of claim 1, wherein projecting the array of the light shapes comprises projecting a single light shape to different positions on the array.

10. The method of claim 1, wherein processing the reflected light shapes comprises one or both of:
    determining a distance between two adjacent reflected light shapes, and
    determining a change in a shape of the reflected light shape.

11. A detection system, comprising:
   a projecting device located at a platform configured to project an array of light shapes, wherein each of the light shapes has a geometric shape that does not overlap with any other of the light shapes within an operating range of the projecting device;
   a light detector configured to detect, as reflected light shapes, a plurality of the light shapes reflected from an object in a projection path of the light shapes; and
   a processor configured to:
      process the reflected light shapes to determine at least one of: distance from the platform to the object, orientation of the object, an edge of the object, and a corner of the object,
      maintain a first library of shapes, wherein each shape in the first library corresponds to at least a portion of one of the light shapes, and
      identify the object from the processing of the reflections, wherein identifying comprises:
         correlating fiducial points of one of the reflected light shapes to a shape in the first library of shapes; and
         finding corresponding one or more primary shapes in the first library, wherein the primary shape is the shape that matches a target reflected light shape to at least a first threshold matching score.

12. The detection system of claim 11, wherein the processor, when there is no primary shape in the first library, is configured to find corresponding one or more secondary shapes in the first library that match the target light shape to at least a second threshold matching score lower than the first threshold matching score.

13. The detection system of claim 12, wherein, when a secondary shape is found, the processor is configured to verify validity of a secondary shape with a highest matching score.

14. The detection system of claim 12, wherein the processor, when there is no primary shape and no secondary shape in the first library, is configured to match the reflected light shape to a second library of shapes.

15. The detection system of claim 11, wherein the processor processes the reflected light shapes by one or both of:
    determining a distance between two adjacent reflected light shapes, and
    determining a change in a shape of the reflected light shape.

16. The detection system of claim 11, wherein the processor is configured to generate a map of an environment around the platform using the identified object.

17. The detection system of claim 16, wherein the processor is configured to:
    determine regions of interest (ROI) from the map;
    generate an expected map of at least one ROI, wherein, when the platform is a mobile platform, ego-motion information of the platform is used for the expected map;
    compare a latest map of the at least one ROI to the expected map;
    generate, using the comparison, a probability P of collision by the platform with an object in the at least one ROI; and
    perform, when the probability P is greater than a safety factor, one or more of: alerting an occupant of the platform, alerting the object in the at least one ROI, and controlling the platform to avoid the object in the at least one ROI.

18. The detection system of claim 11, wherein the projecting device is configured to change a characteristic of the array of light shapes by one or more of:
    changing dimensions of the array;
    changing a size of at least one of the light shapes;
    changing a density of the light shapes in the array;
    changing a wavelength for at least one of the light shapes;
    changing, for at least one light shape, to a different geometric shape;
    changing whether the lights shapes are projected continuously or are pulsed; and
    changing an intensity of at least one of the light shapes.

19. The detection system of claim 11, wherein the projecting device is configured to operate the array of light shapes in one of detecting mode or tracking mode.

20. The detection system of claim 11, wherein the projecting device is configured to project the array of the light shapes by projecting a single light shape to different positions on the array.

* * * * *